United States Patent Office 3,140,860
Patented July 14, 1964

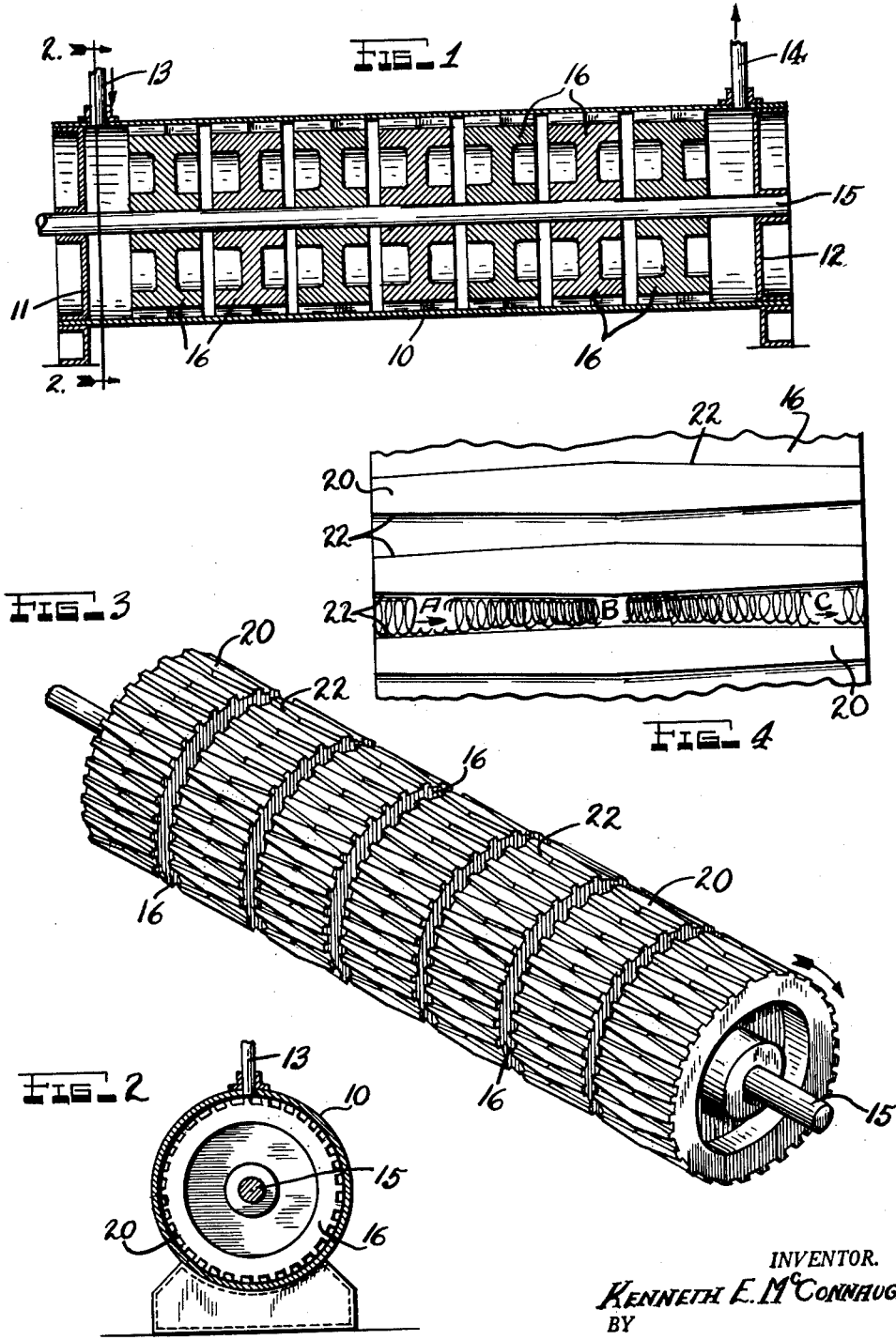

3,140,860
EMULSIFIER
Kenneth E. McConnaughay, P.O. Box 871,
Lafayette, Ind.
Filed Dec. 30, 1960, Ser. No. 79,681
6 Claims. (Cl. 259—9)

This invention relates to an emulsifier, and more particularly to an emulsifying apparatus for use in the preparation of bituminous emulsions of the type in which a bitumen, such as asphalt, is dispersed in water. An emulsifier of this general type is the subject matter of my prior United States Patent No. 2,118,616, issued May 24, 1938, and of which my present invention constitutes an improvement.

It is an object of my invention to provide such an emulsifier which can be simply and easily constructed, which will insure an intimate mixing and emulsification of the materials passing therethrough, which will have a high flow rate, and which will be simple and economical to operate.

In carrying out my invention I employ a shell, conveniently a length of pipe, in which there is mounted a longitudinal shaft having a plurality of axially spaced rotors mounted thereon. A series of shear blocks are provided around the circumference of each of the rotors, with the outer faces of said blocks being disposed immediately adjacent the inner shell face. The spacing between adjacent shear blocks is sufficient to direct the fluid flow from one end of the shell to the other between the adjacent blocks and between said blocks and the inner face of the shell.

The accompanying drawing illustrates my invention. In such drawing:

FIG. 1 is an axial section through my emulsifier;
FIG. 2 is a vertical section taken on the line 2—2 of FIG. 1;
FIG. 3 is an isometric view of the shaft and rotor assembly removed from the shell; and
FIG. 4 is a fragmental view of a circumferential section of one of the rotors.

In the emulsifier illustrated, the shell 10 forming the body of the emulsifier is conveniently of a length of pipe closed at its ends by heads 11 and 12, and provided with an inlet 13 and outlet 14 such that fluid movement is from the left to right as viewed in FIG. 1. Concentric with the shell and supported from the end heads 11 and 12 is a rotatable shaft 15 which extends outwardly beyond one of the heads for connection to any suitable power source.

As shown in FIGS. 1 and 3, a plurality of rotors 16 are rigidly mounted in axially spaced position on the shaft 15 for rotation therewith. A plurality of circumferentially spaced frusto-diamond shaped shear blocks 20 are formed around the circumference of each of the rotors. The distance between the outwardly presented faces on diametrically opposed shear blocks approximates the internal diameter of the shell 10, so that upon rotation of the shaft 15, the outer faces of the blocks 20 will cooperate with the inner wall of the shell 10 to produce shear forces for effecting emulsification of the materials passing through the emulsifier.

As shown in FIG. 4, the side walls 22 on the blocks 20 extend generally diametrically inwardly from the outer rotor periphery and diverge inwardly from the end faces of the rotors. The opposed block side walls define opposed equiangular obtuse angles which thus gives said shear blocks a maximum width at points intermediate the lengths of said blocks. As will be clear from FIG. 4, the side walls 22 on the adjacent shear blocks on each rotor thus form flow passages which are constricted in the transverse plane of the rotor to produce changes in both the velocity and pressure of the fluid flowing between the shear blocks with a resulting turbulent venturi action. For example, as shown in FIG. 4, the pressure of the fluid moving in the direction of the arrow through the area A is gradually decreasing while the velocity of said fluid moving through said area A is gradually increasing until said fluid enters the constricted area B in which area the velocity is at its maximum and the pressure is at its minimum. Continued movement of the fluid between the shear blocks into the area C causes the velocity of said fluid to decrease and the pressure of said fluid to increase. Thus, the fluid moving through the passages defined by the adjacent shear blocks is subjected to changes in velocity and pressure which create an extremely turbulent fluid flow to thus enhance the emulsifying action of the outer faces of the shear blocks rotating in close proximity to the inner wall of the shell 10. With the rotors being disposed in axially spaced position along the shaft 15, the fluid moving through the length of the shell 10 is thus subjected to alternate changes in pressure and velocity and to the shearing action of the block faces rotating in close proximity to the inner shell walls for effecting a complete emulsification of said fluid. Further, the close proximity of the inner shell walls and the outer rotating faces of the shear blocks 20 insures that substantially all of the fluid passing through the emulsifier will pass between a plurality of the shear blocks and thus be subjected to the emulsifying action of the flow passages between said blocks.

One or more rotors may be employed and the rate of rotation of said rotors may vary depending upon the degree of emulsification desired, the materials to be emulsified, etc. For example, I have achieved excellent results in emulsifying a Mid-Continent type of asphalt with water employing seven rotors rotating at 1,800 r.p.m., and in emulsifying a California or Venezuelan type asphalt with water employing five rotors rotating at 1,800 r.p.m. In both of these examples the materials were emulsified at the rate of 6,000 gallons per hour.

I claim as my invention:

1. An emulsifier, comprising a hollow cylindrical shell having an inlet opening at one end and a discharge opening at the other end, a rotatable shaft coaxial with said shell, said shaft having at least one rotor rigidly mounted thereon for rotation therewith, and a plurality of circumferentially spaced shear blocks on the periphery of each rotor immediately adjacent the inner wall of said shell, said blocks forming alternately disposed constricting and expanding flow passages through the emulsifier.

2. An emulsifier as set forth in claim 1 in which said shear blocks comprise axially extending projections on the rotor periphery, the side walls of said blocks extending obliquely inwardly from the end faces of said rotor.

3. An emulsifier as set forth in claim 2 in which the side walls of said shear blocks extend generally diametrically inwardly from the outer rotor periphery.

4. An emulsifier as set forth in claim 1 in which the oposed side walls on each of said shear blocks define a pair of equiangular opposed obtuse angles.

5. An emulsifier as set forth in claim 1 in which said shear blocks have a frustro-diamond shape with their longitudinal axes parallel to the axis of rotation of said rotors.

6. An emulsifier, comprising an elongated hollow shell having an inlet adjacent one of its ends and an outlet adjacent its opposite end, a rotatable shaft extending through said shell, at least one rotor rigidly mounted on said shaft between said inlet and outlet, and a plurality of circumferentialy spaced shear blocks on the periphery of each rotor immediately adjacent the inner wall of said shell, said blocks forming alternatively disposed constricting and expanding flow passages through the emulsifier.

References Cited in the file of this patent

UNITED STATES PATENTS

| | | |
|---|---|---|
| 2,027,203 | Schneider | Jan. 7, 1936 |
| 2,469,999 | Stober | May 10, 1949 |
| 2,857,144 | Gurley et al. | Oct. 21, 1958 |

FOREIGN PATENTS

| | | |
|---|---|---|
| 7,621 | Australia | July 27, 1933 |